United States Patent
Farra

(10) Patent No.: US 6,408,070 B2
(45) Date of Patent: *Jun. 18, 2002

(54) METHOD AND APPARATUS FOR ECHO CONTROL IN A COMMUNICATION SYSTEM

(75) Inventor: David Dal Farra, Nepean (CA)

(73) Assignee: Nortel Networks Limited, St.-Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,800

(22) Filed: Apr. 30, 1998

(51) Int. Cl.[7] ................................................ H04M 1/00
(52) U.S. Cl. ........................... 379/406.01; 379/406.04; 379/390.01
(58) Field of Search .................................. 379/387–390, 379/394, 398–400, 402, 406, 409–411, 414, 416–417, 420, 286, 386; 370/201, 286–291

(56) References Cited

U.S. PATENT DOCUMENTS

| | | | | |
|---|---|---|---|---|
| 4,852,161 A | * | 7/1989 | Hagiwara | 379/410 |
| 5,007,046 A | * | 4/1991 | Erving et al. | 379/406 |
| 5,099,472 A | * | 3/1992 | Townsend et al. | 379/411 |
| 5,319,702 A | * | 6/1994 | Kitchin et al. | 379/386 |
| 5,600,715 A | * | 2/1997 | Bingel | 379/379 |
| 5,668,794 A | * | 9/1997 | McCaslin et al. | 379/409 |
| 5,940,499 A | * | 8/1999 | Fujii et al. | 379/392 |
| 6,178,162 B1 | * | 1/2001 | Dal Farra et al. | 370/286 |

FOREIGN PATENT DOCUMENTS

JP     56019235 A  *  2/1981  ............ H04M/1/58

* cited by examiner

Primary Examiner—Curtis Kuntz
Assistant Examiner—George Eng

(57) ABSTRACT

The invention relates to an acoustic echo canceller particularly well suited for use in a hands-free terminal or teleconference system. The echo canceller is designed to assess the inherent signal attenuation occurring in the analog loop that connects the terminal to the switch mechanism of the PSTN domain or the PBX domain. The echo canceller is then adjusted in accordance with the degree of signal attenuation manifested by the loop. For high signal attenuation levels, the degree of echo control at the terminal is reduced since the signal attenuation occurring in the loop itself will compensate for the reduction, allowing to reach the echo control target at the far end of the loop (switch side). This feature avoids overly attenuating the echo at the terminal by taking advantage of the inherent echo control provided by the local loop conductors.

34 Claims, 2 Drawing Sheets

METHOD AND APPARATUS FOR ECHO CONTROL IN A COMMUNICATION SYSTEM

FIELD OF THE INVENTION

The present invention relates to a method and a system for inhibiting echo in a communication line. The system is particularly useful for communication systems where an echo is susceptible to occur as a result of an acoustic feedback taking place at one end of the communication link (acoustical echo) or as a result of hybrid converters in the telecommunication network (electrical echo).

BACKGROUND OF THE INVENTION

In a typical telephone network, two types of echoes may be present: acoustical echo and electrical echo. Acoustical echo is susceptible to occur in a telecommunication network when a hands-free telephone terminal is used. The speech signal generated from the speaker in the terminal propagates in the form of an acoustic wave through an acoustic environment (air) and part of it will be fed back toward the microphone of the terminal. This signal will be transmitted back to the talker and therefore creates echo.

Electrical echo results from the presence of a hybrid converter that is required to connect the unidirectional four wire link from the public switched telephone network (PSTN) to the local two wire loop. The basic function of the hybrid converter is to separate the transmitted signal originating in the local loop from the received signal in the PSTN section, and vice versa. This process requires the energy of the received signal to pass fully in the local loop. However, due to an impedance mismatch in the hybrid converter, part of the received energy is reflected back to the transmitting port. As a result, a talker hears his own delayed speech which, of course, is undesirable.

The traditional approach for reduction of echo in communication networks is to use echo suppressors. A typical echo suppressor acts like a switch that monitors the voice signals travelling in both directions. It detects which person is talking and blocks the signal travelling in the opposite direction. The drawback of such echo suppressors is that they tend to "chop" speech signals when the subscribers talk back and forth quickly due to the response time for monitoring the speech activities. Moreover, during double talk, i.e., when the subscribers talk simultaneously, the suppressor fails to control the echo.

One possibility to avoid the problems of echo suppressors is to provide circuitry or an algorithm that, instead of blocking speech signals in one direction in the communication link, cancels the echo by using an adaptive filter. In essence, an adaptive echo canceller synthesises the echo that is then subtracted from the composite signal (speech signal plus echo signal). A residual echo from this subtraction can still be at a noticeable levels in a practical echo cancelling system because the adaptive filter may not be able to model perfectly the true echo path as a result of time-varying room impulse response, insufficient filter length, non-linear effects, finite precision computations, etc. Consequently, a switched loss device is often used in an echo canceller for further reduction of the residual echo.

Another difficulty arises as a result of the overly conservative target established for existing echo cancellation devices. The problem arises primary in situations where the local loop on an analog CPE (customer premises equipment) manifests a significant signal attenuation characteristics and inherently attenuates the signals propagating in the loop, including echo signals. Thus, in a loop with a higher intrinsic signal attenuation characteristics the existing strategy of echo control results in excessive echo attenuation, that reduces the audio quality of the link. Since the signal attenuation characteristics are different from one CPE to another CPE the current approach is to set the echo canceller target conservative enough so the loops with low signal attenuation characteristics(low loss) will still inhibit echo to a desired degree. This, however, results into a overly conservative echo suppression in cases where the loops manifest a high signal attenuation characteristics.

Thus, there exists a need in the industry to provide an improved echo canceller that can avoid excessive signal attenuation, particularly by operation of a switched loss device, when the communication channel through which the echo propagates manifests a significant level of inherent signal attenuation.

OBJECTIVES AND SUMMARY OF THE INVENTION

An object of this invention is to provide an improved method and apparatus for performing echo inhibition.

Another object of the invention is to provide a method and apparatus for performing echo inhibition that can tailor the level of signal attenuation for inhibiting echo in dependence upon the degree of inherent signal loss manifested by the communication channel through with the echo signal is susceptible to propagate.

As embodied and broadly described herein, the invention provides an echo canceller for managing echo signals occurring in a return channel of a communication device, said communication device being coupled to a switch mechanism through a local loop, said signal processing device including:

a sensor for generating an output signal indicative of a degree of inherent signal attenuation manifested by the local loop;

an echo attenuation device for reducing a magnitude of an echo occurring in the return channel of the communication device, said echo attenuation device being responsive to said output signal to vary a level of echo attenuation in dependence upon the degree of inherent signal attenuation of the local loop observed by said sensor.

In a most preferred embodiment the communication device is a CPE (Customer Premises Equipment) provided with an echo attenuation device that includes two main components, namely an adaptive filter to model the echo path and generate an echo estimate signal that is subtracted from the echo corrupted signal propagating in the return path of the CPE, and a switched loss device that complements the echo attenuation process implemented by the adaptive filter. In a specific embodiment, a switched loss device can be implemented by a multiplier, multiplying the signal by a value less than one to create loss. The switched loss device reduces acoustic levels by selectively inserting variable losses on the received and/or transmitted audio signals. More specifically, the switched loss device includes a first switched loss module on the forward channel of the CPE, the one that carries the signal that is a precursor of the echo, and a switched loss module on the return channel of the CPE. A switched loss controller controls the degree of signal attenuation implemented by the individual switched loss modules. A loop loss sensor is provided for measuring or estimating the inherent signal attenuation in the local loop. The loop loss sensor issues an output signal that is directed to the switched loss controller. In response to that output signal, the switched loss controller adjusts the level of signal attenuation implemented by the switched loss modules to take into account the loop loss. As a result, a more precise echo attenuation mechanism is provided that reduces the likelihood of excessive echo control.

The loop loss sensor may take various forms. For instance the loop loss sensor may be a current measuring device that estimates the resistance of the local loop conductors, hence loop loss, by sensing the loop current. Since the voltage impressed across the loop conductors at the far end of the loop (the end that connects to the switch) is well known and generally constant and the impedance of the CPE also known, one can establish a nominal loop current value. Any deviation from this value (disregarding the components tolerance factor) is primarily due to a varying loop length. If the current observed by the loop loss sensor is significantly below the nominal value, one may conclude that the loop is long, thus it manifests a high degree of signal attenuation. In contrast, a higher current is indicative of a shorter loop, hence the loop manifests a lesser degree of signal attenuation. The switched loss controller receives the output signal of the loop loss sensor that is indicative of the degree of loop loss manifested by the loop. In response to that output signal, the switched loss controller adjusts the set-points of the individual switched loss modules so as to vary the degree of echo attenuation.

Practically, the loop loss sensor may be placed in the CPE. At that location, the loop loss sensor is capable of determining the degree of loss manifested by the local loop. In this example, the local loop is the conductor connecting the CPE to the switch. Thus the CPE, when connected to a certain local loop will adjust the level of echo control in dependence of the loop length in that particular installation. In one possible embodiment the switch may be in the central office of the PSTN network, or be part of a PBX installation.

In a possible variant that is particularly useful in situations where the local loop terminates on a line card in the switch device that injects a constant current (the line card acts as a current source) in the local loop, a voltage sensor can be used to measure the voltage at an appropriate location and determine the level of inherent signal attenuation in the loop. One possibility is to measure the voltage across the conductors of the local loop where they connect with the line card. The voltage variation with respect to a nominal value is indicative of the inherent local loop loss characteristics. Under this embodiment, the sensor is remote from the CPE. As a practical matter, the entire echo canceller can be separated from the CPE.

The CPE terminal can be a telephone, a teleconference device or any other communication system that is intended to be connected to the local loop for voice communications purposes.

As embodied and broadly described herein, the invention also provides a method for reducing a magnitude of an echo occurring in a return channel of a communication device, the communication device being coupled to a switch mechanism through a local loop, said method including the steps of:

a) assessing a level of inherent signal attenuation manifested by the local loop;

b) utilizing the level of inherent signal attenuation manifested by the local loop assessed at step a to reduce a magnitude of the echo occurring in the return channel of the communication device.

As embodied and broadly described herein, the invention also provides a CPE for coupling to a switch mechanism through a local analog loop, said CPE comprising:

an echo canceller for reducing the magnitude of an echo occurring in a return channel of said CPE, said echo canceller including:

a sensor for generating an output signal indicative of a degree of inherent signal attenuation manifested by the local analog loop;

an echo attenuation device for reducing a magnitude of an echo occurring in the return channel of said CPE, said echo attenuation device being responsive to said output signal to vary a level of echo attenuation in dependence upon the degree of inherent signal attenuation of the local loop observed by said sensor.

As embodied and broadly described herein, the invention also provides an echo attenuation device for reducing a magnitude of an echo occurring in a communication device, said echo attenuation device being responsive to a signal indicative of an inherent loss characteristics of a pathway transporting a signal precursor of the echo signal and the echo signal to vary a level of echo attenuation in dependence of the signal.

DESCRIPTION OF A PREFERRED EMBODIMENT

The present invention provides an improved echo canceller system that is particularly well suited for use in communications networks where an echo is susceptible to occur as a result of an acoustic feedback taking place at one end of the communication link (acoustical echo) or electrical echo.

Figure 1:
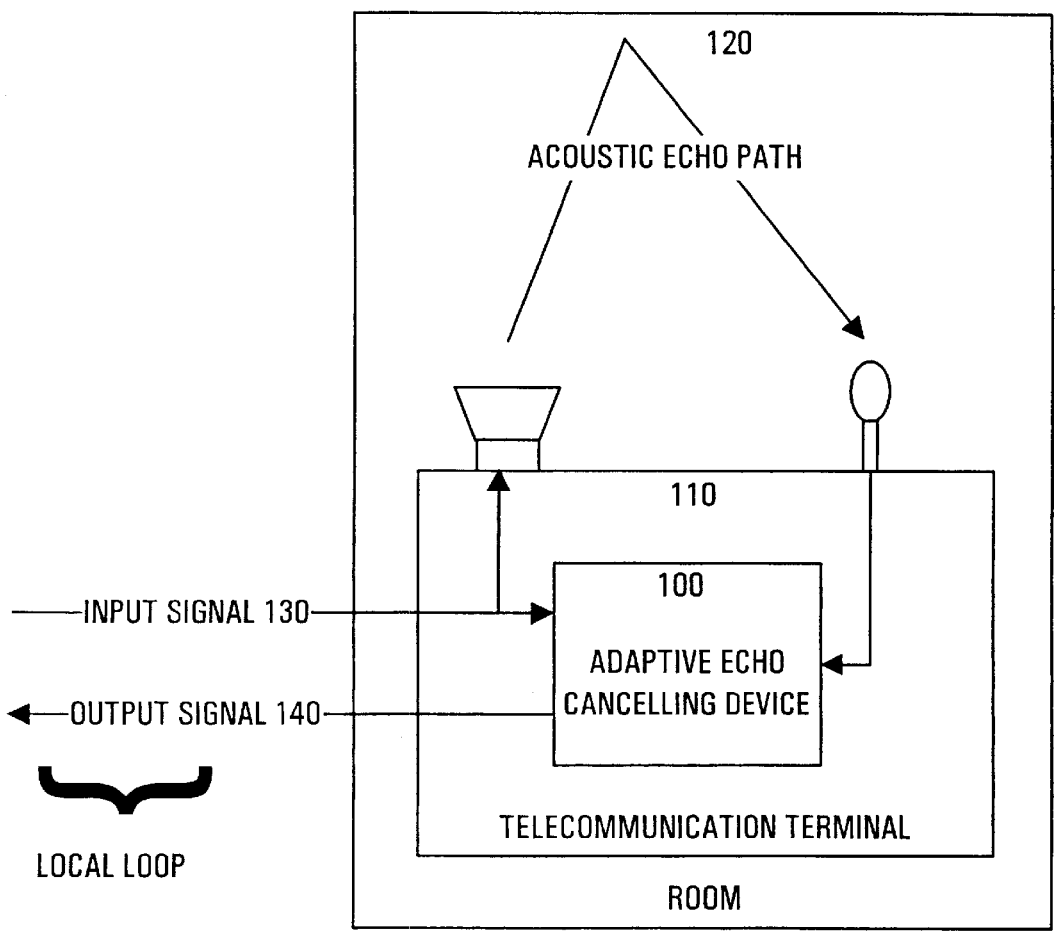
FIG. 1 is a block diagram of a hands-free telecommunication terminal featuring a novel echo canceller in accordance with the invention.

FIG. 1 illustrates a possible embodiment for the echo canceller. In this form of construction the echo canceller 100 is located within the telecommunication terminal 110 (CPE), such as a hands-free telephone. The telecommunication terminal 110 is placed in a room 120 were an acoustic echo path is present. The echo canceller 100 receives an input signal 130 from a far-end terminal that is delivered to the terminal 110 over an analog local loop. This signal 130 is also supplied to the loudspeaker output of the telecommunication terminal 110 such that a user may hear the other party. The resulting sound wave generated by the loudspeaker will be picked up by the microphone and fed back to the telecommunication terminal 110. The microphone sends the signal to the adaptive echo canceller 100 which removes as much of the echo as possible and sends an output signal 140 to the far end terminal. Ideally, this signal should be echo free as much as possible.

Figure 2:
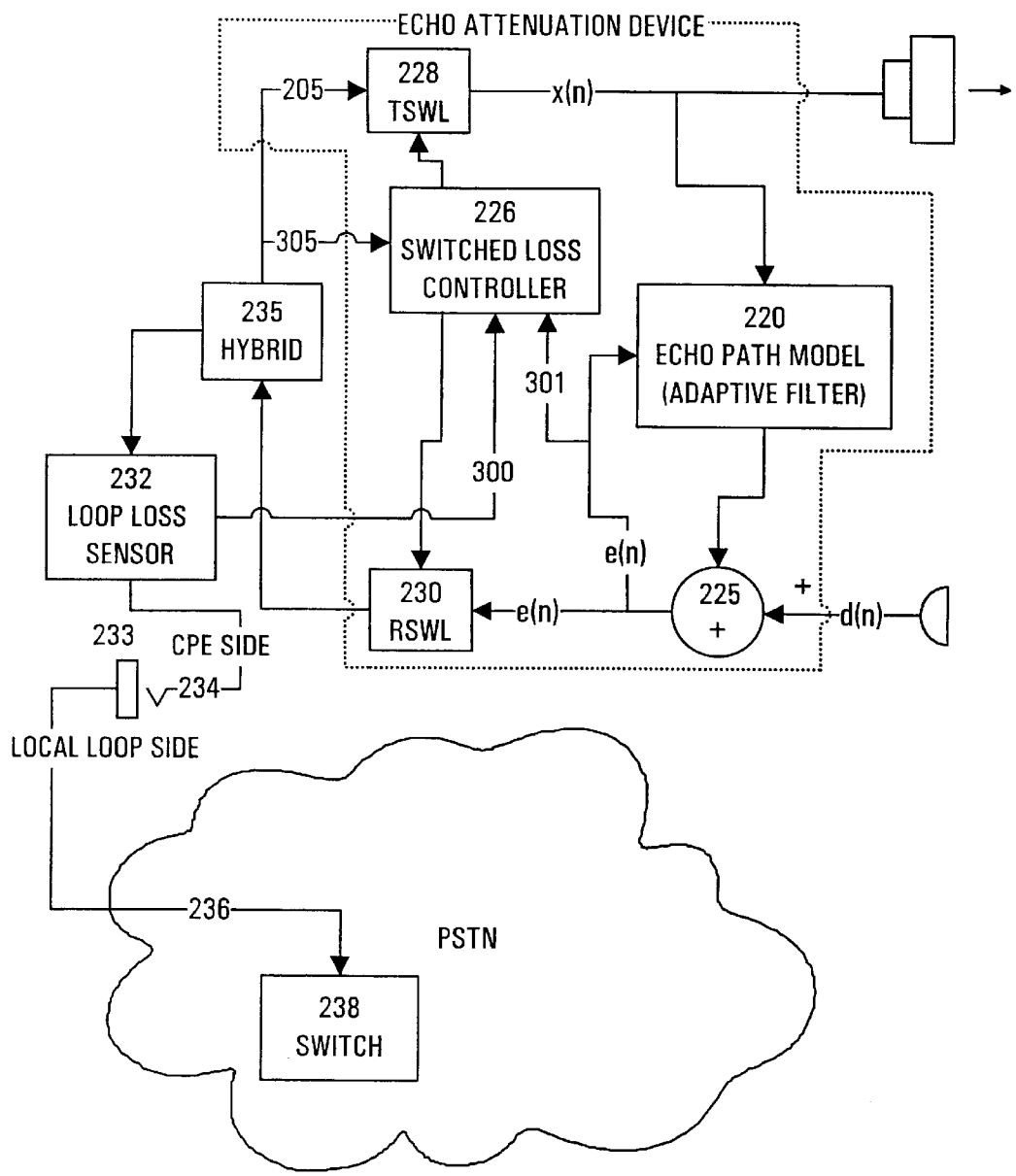
FIG. 2 is a detailed block diagram of the echo canceller depicted at FIG. 1.

FIG. 2 shows a block diagram of the echo canceller 100 from FIG. 1. The echo canceller includes an echo attenuation device designed to reduce the magnitude of the echo signal generated as a result of the acoustic feedback. The echo attenuation device comprises an adaptive filter 220 and an adder 225. In this Figure, the input 205 from the far-end terminal is the discrete-time signal used to drive the loudspeaker in FIG. 1 and it constitutes the reference signal that is used by the adaptive filter. This signal is denoted x(n). A second input denoted d(n) is the signal picked up by the microphone in the room 120 as depicted in FIG. 1a. The signal d(n) contains a portion of x(n) in the form of echo, background noise, and possibly, local speech.

The adaptive filter 220, whose coefficient vector is $H_{n-1}$, is excited by x(n) to produce a replica of the echo signal. The residual echo signal e(n) (error signal) is then obtained by subtracting this replica of the echo signal from the signal d(n) and can be expressed as follows:

$$e(n)=d(n)-H_{n-1}^{T}X_{n}$$

where $X_n=[x(n), x(n-1), \ldots x(n-(L-1))]^T$ and L is the length or order of the adaptive filter.

The echo attenuation device also comprises a pair of switched loss modules and a switched loss controller. A switched loss module 228 is located in the transmit channel of the terminal 110, the one that conveys the signal that is a precursor of the echo. A switched loss module 230 is placed in the return channel of the terminal and receives the residual echo signal e(n). The switched loss controller 226 is designed to regulate the level of attenuation implemented by the switched loss modules 228 and 230. The switched loss controller has an input receiving the data indicative of the inherent local loop loss, another input receiving the residual echo signal e(n) and yet another input for receiving the signal from the far end terminal. The switched loss controller 226 has two outputs, one per switched loss module, to dispatch to each module instructions embedded in a signal in any suitable format on the level of attenuation to the implemented. The structure of the switched loss controller will be described below in connection with FIG. 2.

The echo canceller also includes a loop loss sensor 232 that is placed immediately downstream of the hybrid 235, that connects the forward and return channels of the terminal 110 to the analog local loop link. The loop loss sensor 232 leads to any suitable jack 234 that can be connected to a mating wall socket 233. The mating wall socket 233 is the termination point of the local loop 236. In a typical installation, the local loop is a pair of conductors (tip and ring) that connect the terminal 110 to a switch 238 (either a switch that constitutes an entry in the PSTN domain, PBX domain or any other suitable installation). In the example shown, the local loop is an analog link connecting to the PSTN. The switch 238, among other tasks may convert the analog signals generated from the terminal 110 into digital format that is then processed in the PSTN, and vice versa.

The loop loss sensor 232 may take various forms. For instance the loop loss sensor may be a current measuring device that estimates the resistance of the loop conductors, hence loop loss, by sensing the loop current. In a variant, the loop loss sensor may be an impedance bridge that estimates the loop impedance, hence loop loss.

The loop loss sensor outputs a signal indicative of the degree of signal loss that the loop manifests. In the example above, where the loop loss sensor is a current measuring device, then the output signal may simply be the magnitude of the current passing in the loop. The specific format and type of information embedded in the output signal are not critical to the invention as long as that information can be processed to derive the amount or degree of attenuation a signal undergoes when passing in the loop.

The magnitude of the electric current can be used to determine the loop resistance that determines the loop loss. The switch 238 establishes across the tip and ring conductors of the local loop a constant voltage. In addition, the impedance at the terminal side (CPE) of the loop is well known. Thus, one can easily compute a nominal current value for a typical installation. Any deviation from this current value indicates that the loop is longer or shorter than a certain established nominal loop length. In turn, the deviation allows to estimate the value of the signal loss that the specific loop will manifest.

It should be appreciated that such loop loss sensor structure is not suitable for applications where a line card of the switch to which the local loop connects behaves as a current source. For those applications, an appropriate sensor, such as a voltage sensor could be used.

The switched loss controller 226 includes an input 300 that receives the output signal of the loop loss sensor 232, an input 301 that is the residual echo signal and also an input 305 that is the signal from the far end terminal and is identical to the signal 205. The processing of those signals by the controller 226 is effected in a known manner, except for the contribution of the output from the loop loss sensor 232 that is a novel aspect of this invention. The controller 226 computes the actual setting of the switched loss modules 238 and 230. The switched loss modules 228 and 230 will attenuate the signal on the transmit and receive channels, respectively of the terminal. This causes less echo generation. The switched loss allocation between the modules 228 and 230 can vary within a wide range and it is not necessarily equally distributed between the modules.

For example, if echo path loss is the means by which echo control is regulated, the total echo path loss (EPl) seen at the far end of the loop (switch 238 side) can be defined by the following equation:

$$EPl=2*Ll+(Rl+Tl)+(TSwl+RSwl)+Eal+ERLE$$

Where:
  EPl is the total echo path loss
  ERLE (echo reduction loss estimate) is the loss introduced by the adaptive filter 230
  Eal is the loss resulting from the echo coupling mechanism (in this case acoustic)
  Rl is the total of the electronic losses of the CPE in the return channel
  Tl is the total of the electronic losses of the CPE in the forward or transmit channel
  TSwl is the loss introduce d by the switched loss module 228
  RSwl is the loss introduced by the switched loss module 230
  2*Ll is the loss inherent to the local loop.

The output signal generated by the loop loss sensor provides an indication or estimate of the measure of the value 2*Ll that accounts for the attenuation of the signal in the forward path of the local loop and also the attenuation in the return path of the local loop (thus the factor of 2 in the equation). The value of ERLE is determined in a known manner on the basis of the residual echo signal (input 301) and also on the basis of the signal from the far end terminal (input 305) in FIG. 2, while the values of TSwl and Rswl are the current settings of the switched loss modules 228 and 230. The value 2*Ll is used to fine-tune the settings of the switched loss modules 228 and 230. For instance if the controller 226 determines that a current value deviation exists with relation to a nominal current value, a change in the setting of each switched loss module is effected. For example, when the current value reported by the loop loss sensor 232 exceeds the nominal current value, which indicates that the inherent loop loss is small, the total switched loss is raised. In contrast, when the actual current value is less than the nominal current value, then the total switched loss is lowered.

The switched loss modules 228 and 230 can be implemented by simple multipliers that multiply the audio stream by a value less than one so as to create loss. For instance, multiplying by 0.5 is the same as 6 dB loss (20 log (0.5)=−6 dB).

In a specific example of operation of the system, the switched loss controller 226 operates on the basis of a target EPl. This means that the switched loss controller 226 will dispatch settings to the switched loss modules 228 and 230 such as to meet a specific EPl target. The major component of the EPl comes from the adaptive filter 220. This is indicated by the value of the residual echo signal (input 301) and the signal from the far end terminal (input 305). If this signal is high, indicating that the echo has not been almost completely eliminated by the adaptive filter 220, the switched loss controller 226 will compute settings for the switched loss modules 228 and 230 to compensate. While making the computations for the settings of the switched loss modules 228 and 230, the switched loss controller 226 takes into account the value 2*Ll representing the inherent loss due to the local loop, as reported by the loop loss sensor 232. This value is dependent upon the particular CPE installation and it is influenced by the length of the local loop. Once the individual settings of the switched loss modules 228 and 230 are determined, the appropriate signals are sent to the switched loss modules 228 and 230. As discussed previously, the switched loss modules 228 and 230 may be implemented by multipliers, their settings being values by which the audio stream is multiplied to create loss. A no loss condition is established when the setting of a given switched loss module is set to one.

It will be easily appreciated that any computation of the switched loss module settings without taking into account the value 2*Ll is likely to produce too much loss that may degrade the audio quality.

Other strategies to regulate the settings of the switched loss modules 228 and 230 can also be considered. For example, echo can be regulated through a target echo level sent to the far end terminal rather than the target EPl. Under this variant, the computation of the switched loss settings takes into account the value Ll to provide a more precise echo attenuation control.

The system described above may be implemented by using any suitable digital signal processing technique as presently known or prospectively known to those skilled in the art. Such implementation would require a suitable computing platform and software to process the various signals in accordance with the strategies described above. Such computing platforms normally include a CPU and a memory for storage of data and of instructions to be executed by the CPU during the signal processing operations. The various implementation and details necessary to realize a physical device embodying the principles of the invention do not need to be described here because they would be readily apparent to those skilled in the art.

The above description of the invention should not be interpreted in any limiting manner since variations and refinements of the preferred embodiment are possible without departing from the spirit of the invention. The scope of the invention is defined in the appended claims and their equivalents.

I claim:

1. An echo canceller for reducing a magnitude of an echo occurring in a return channel of a communication device, said communication device being coupled to a local loop connecting said communication device to a remote switch mechanism, said echo canceller including:

a sensor operative to measure from the local loop at least one parameter of the local loop for assessing a degree of inherent signal attenuation manifested by the local loop, said sensor generating an output signal indicative of the degree of inherent signal attenuation manifested by the local loop;

an echo attenuation device for reducing the magnitude of the echo occurring in the return channel of the communication device, said echo attenuation device being responsive to said output signal to vary a level of echo attenuation in dependence upon the degree of inherent signal attenuation of the local loop observed by said sensor.

2. An echo canceller as defined in claim 1, wherein said echo attenuation device includes a first unit to generate an estimate of the echo and a second unit receiving said echo estimate for conditioning a signal propagating in the return channel of the communication device to inhibit echo therein.

3. An echo canceller as defined in claim 2, wherein said first unit includes an adaptive filter.

4. An echo canceller as defined in claim 3, wherein said adaptive filter includes an input for receiving a signal precursor of the echo occurring in the return channel of the communication device.

5. An echo canceller as defined in claim 4, wherein said second unit is an adder to subtract from the signal propagating in the return channel of the communication device the echo estimate.

6. An echo canceller as defined in claim 2, wherein said echo attenuation device includes a switched loss device.

7. An echo canceller as defined in claim 6, wherein said switched loss device includes a first switched loss module for attenuating the echo signal propagating in the return channel of the communication device.

8. An echo canceller as defined in claim 7, wherein a level of signal attenuation manifested by said first switched loss module is dependent upon the degree of inherent signal attenuation of the local loop observed by said sensor.

9. An echo canceller as defined in claim 8, wherein said switched loss device includes a second switched loss module for processing a signal precursor of the echo in the return channel of the communication device.

10. An echo canceller as defined in claim 9, wherein said switched loss device includes a switched loss controller to regulate a degree of signal attenuation implemented by said first and second switched loss modules.

11. An echo canceller as defined in claim 10, wherein said switched loss controller is coupled to said sensor and includes an input for receiving said output signal indicative of a degree of inherent signal attenuation manifested by the local loop.

12. An echo canceller as defined in claim 11, wherein said switched loss controller is operative to determine a switched loss setting of either one of said first and second switched loss modules at least partly on a basis of said output signal.

13. An echo canceller as defined in claim 1, wherein the parameter measured by said sensor is a magnitude of electric current in the local loop.

14. An echo canceller as defined in claim 12, wherein said first and second switched loss modules are multipliers.

15. An echo canceller as defined in claim 1, wherein the communication device is a CPE.

16. A method for reducing a magnitude of an echo occurring in a return channel of a communication device, the communication device being coupled to a local loop connecting said communication device to a remote switch mechanism, said method including the steps of:

a) measuring from the local loop at least one parameter of the local loop;

b) assessing a level of inherent signal attenuation manifested by the local loop on a basis of the at least one parameter measured from the local loop;

c) reducing the magnitude of the echo occurring in the return channel of the communication device at least partly on a basis of the level of inherent signal attenuation manifested by the local loop assessed at step b.

17. A method as defined in claim 16, comprising the step of altering a degree of signal attenuation of a switched loss module in dependence of the level of inherent signal attenuation manifested by the local loop.

18. A method as defined in claim 16, wherein the parameter measured from the local loop is a magnitude of an electric current passing in the local loop.

19. A CPE coupled to a local analog loop connecting said CPE to a remote switch mechanism, said CPE comprising:
    an echo canceller for reducing a magnitude of an echo occurring in a return channel of said CPE, said echo canceller including:
        a sensor operative to measure from the local analog loop at least one parameter of the local analog loop for assessing a degree of inherent signal attenuation manifested by the local analog loop, said sensor generating an output signal indicative of the degree of inherent signal attenuation manifested by the local analog loop;
        an echo attenuation device for reducing the magnitude of the echo occurring in the return channel of said CPE, said echo attenuation device being responsive to said output signal to vary a level of echo attenuation in dependence upon the degree of inherent signal attenuation of the local analog loop observed by said sensor.

20. A CPE as defined in claim 19, wherein said echo attenuation device includes a first unit to generate an estimate of the echo and a second unit receiving said echo estimate for conditioning a signal propagating in the return channel of said CPE to inhibit echo therein.

21. A CPE as defined in claim 20, wherein said first unit includes an adaptive filter.

22. A CPE as defined in claim 21, wherein said adaptive filter includes an input for receiving a signal precursor of the echo occurring in the return channel of said CPE.

23. A CPE as defined in claim 22, wherein said second unit is an adder to subtract from the signal propagating in the return channel of said CPE the echo estimate.

24. A CPE as defined in claim 21, wherein said echo attenuation device includes a switched loss device.

25. A CPE as defined in claim 24, wherein said switched loss device includes a first switched loss module for attenuating the echo signal propagating in the return channel of said CPE.

26. A CPE as defined in claim 25, wherein a level of signal attenuation manifested by said first switched loss module is dependent upon the degree of inherent signal attenuation of the local loop observed by said sensor.

27. A CPE as defined in claim 26, wherein said switched loss device includes a second switched loss module for processing a signal precursor of the echo in the return channel of said CPE.

28. A CPE as defined in claim 27, wherein said switched loss device includes a switched loss controller to regulate a degree of signal attenuation implemented by said first and second switched loss modules.

29. A CPE as defined in claim 28, wherein said switched loss controller is coupled to said sensor and includes an input for receiving said output signal indicative of a degree of inherent signal attenuation manifested by the local loop.

30. A CPE as defined in claim 29, wherein said switched loss controller is operative to determine a switched loss set point of either one of said first and second switched loss modules at least in part on a basis of said output signal.

31. A CPE as defined in claim 19, wherein the parameter measured by said sensor is a magnitude of electric current in the local loop.

32. A CPE as defined in claim 30, wherein said first and second switched loss modules are multipliers.

33. A CPE as defined in claim 19, wherein said CPE is a hands-free CPE.

34. An echo canceller for reducing a magnitude of an echo occurring in a return channel of a communication device, said communication device being coupled to a local loop connecting said communication device to a remote switch mechanism, said echo canceller including:
    sensor means operative to measure from the local loop at least one parameter of the local loop for assessing a degree of inherent signal attenuation manifested by the local loop, said sensor means generating an output signal indicative of the degree of inherent signal attenuation manifested by the local loop;
    echo attenuation means for reducing the magnitude of the echo occurring in the return channel of the communication device, said echo attenuation means being responsive to said output signal to vary a level of echo attenuation in dependence upon the degree of inherent signal attenuation of the local loop observed by said sensor means.

\* \* \* \* \*